United States Patent Office 3,196,153
Patented July 20, 1965

1

3,196,153
POLY(3,5-DIKETO-PIPERAZINYL-1) COMPOUNDS
Joachim Dazzi, Riehen, near Basel, Switzerland, assignor to Geigy Chemical Corporation, Ardsley, N.Y., a corporation of Delaware
No Drawing. Filed Jan. 18, 1962, Ser. No. 167,191
Claims priority, application Switzerland, Jan. 19, 1961, 764/61, 765/61, 766/61
8 Claims. (Cl. 260—268)

The present invention concerns new heterocyclic compounds as well as processes for their production.

In one aspect of the invention it relates to poly-N-diacetic acid imides of the Formula I

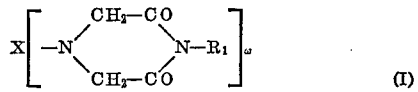

(I)

in which X represents an ω-valent organic radical, $R_1$ represents hydrogen, an aliphatic radical or a mono nuclear aryl radical, and ω is a whole number index of at least 2.

In the Formula I, X represents e.g. an ω-valent aliphatic, cycloaliphatic, aromatic or araliphatic radical, whose chains linking the amino-nitrogen atoms consists exclusively of carbon or, in the majority of cases, of carbon with the inclusion as links of separate double-linked hetero atoms such as oxygen or sulphur. These double-linked hetero atoms may also belong to divalent groups, as for example, the nitrogen atom of amino, alkylamino, aralkylamino, carboxyalkylamino, carbamylalkylamino, hydroxyalkylamino groups. For preference, X represents an alkylene radical, e.g. the 1,2-ethylene or the 1,2- or 1,3- propylene radical, the 1,4- or 2,3-butylene radical, the 1,6-hexylene radical, the 1,10-decylene radical, the 1,12-dodecylene radical, the 1,18-octadecylene radical, or the 1,20 icosylene radical. Of these the straight chained alkylene radicals are preferred. X may also be the β,β'-diethyl ether, the γ,γ'-dipropyl ether, the β,β'-diethyl ethylene glycol ether, or the β,β'-diethylthioether radical. In addition to these X may represent a cycloaliphatic radical, for example the 1,2,-,1,3- or 1,4- cyclohexylene radical, the 4,4'-dicyclohexylene radical or a bi-4'-cyclohexylalkane radical, for example, the bi-4'-cylclohexylmethane, the 2,2-bi-(4'-cyclohexyl)-propane or the 1,1,-bi-(4'-cyclohexyl)-cyclohexane radical; X, however, can also represent a bialkyl mono- or poly- amino radical, for example the bi-ethylene- or bi-α- or bi-β- propyleneamino radical, a bi-ethylene or the bi-α- or bi-β-propylene- alkylamino radical, -carboxyalkylamino radical, -carbamylalkylamino radical, or a corresponding bi-alkylene-alkylenediamino, -cyclohexylenediamino, or -dialkylenetriamino radical. Finally, X can also be an aromatic radical such as, e.g. the 1,2-, 1,3- or 1,4- phenylene radical or an araliphatic radical such as, e.g. the benzylene radical or the 1,2-, 1,3- or 1,4- xylyene radical.

$R_1$ is preferably an alkyl radical especially the methyl, ethyl, n-butyl, n-hexyl or octyl radical, a lower alkenyl radical such as, e.g. the allyl, propenyl or butenyl radical, a hydroxyalkyl radical e.g. the β-hydroxyethyl radical or the γ-hydroxy-propyl or a lower alkoxyalkyl radical such as, e.g. the β-methoxyethyl, β-ethoxyethyl, β-propoxyethyl, γ-methoxypropyl, γ-ethoxypropyl radical or a mer-

2 captoalkyl radical such as e.g. the β-mercaptoethyl radical or also a alkylthioalkyl radical such as e.g. the β-ethylthioethyl, γ-ethylthiopropyl group.

$R_1$ is also a mononuclear aryl radical such as e.g. a phenyl, methylphenyl, chlorophenyl, dimethylphenyl or a dichlorophenyl group.

ω represents 2 in the first place, but may also represent 3.

Particularly valuable compounds correspond to the formula

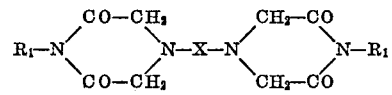

wherein:

R is hydrogen, an alkyl having 1 to 8 carbon atoms, especially methyl, ethyl, n-butyl, alkenyl especially having 3 to 4 carbon atoms such as e.g. allyl, mercaptoalkyl, especially having 2 to 4 carbon atoms such as e.g. β-mercaptoethyl, hydroxyalkyl especially having 2 to 6 carbon atoms, such as e.g. β-hydroxyethyl, β,γ-dihydroxypropyl, an alkylthioalkyl especially having 3 to 5 carbon atoms such as e.g. γ-(ethylthio)propyl, an alkoxyalkyl especially having 3 to 7 carbon atoms, such as e.g. γ-methoxypropyl, and a mononuclear aryl group, especially phenyl, methylphenyl or chlorophenyl X is a member selected from the group consisting of alkylene especially containing 2 to 20 carbon atoms, such as e.g. ethylene, hexylene, cyclohexylene, phenylene, benzylene, xylylene,

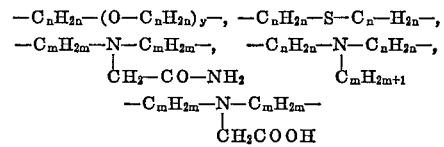

and

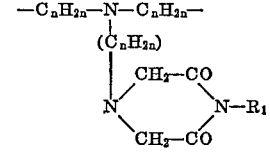

wherein n is 2 to 3 especially 2, m is 2 to 6 especially 2 and 6, y is 1 to 2

In addition to the compounds of the formula

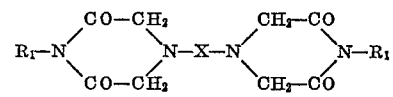

wherein:

$R_1$ is a member selected from the group consisting of hydrogen, an alkyl having 1 to 8 carbon atoms, especially methyl, ethyl, allyl, β-mercaptoethyl, β-hydroxyethyl, γ-hydroxypropyl, γ(ethylthio)propyl, an alkoxyalkyl having 3 to 7 carbon atoms, especially γ-methoxypropyl, phenyl, methylphenyl and chlorophenyl, X is a member selected from the group consisting of alkylene group containing 2 to 20 carbon atoms, especially ethylene, hexylene, cyclohexylene, phenylene, benzylene, xylylene, the

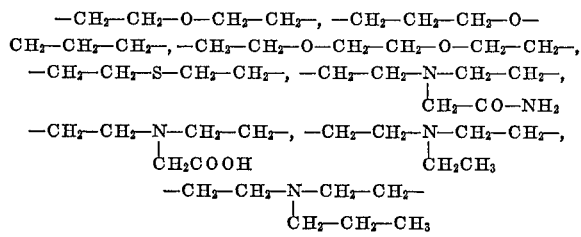

and the

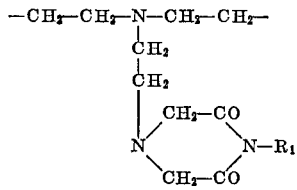

are preferred.

Finally, it is advantageous if the new compounds correspond to the formula

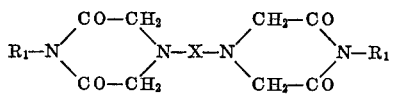

wherein:

$R_1$ is a member selected from the group consisting of hydrogen methyl, ethyl, n-butyl, allyl, β-hydroxyethyl, β-mercaptoethyl, γ-hydroxypropyl, β-methoxyethyl, β-ethoxyethyl, β-propoxyethyl, γ-methoxypropyl, γ-ethoxypropyl, phenyl, methylphenyl and chlorophenyl, X is a member selected from the group consisting of ethylene, propylene, hexylene, xylylene

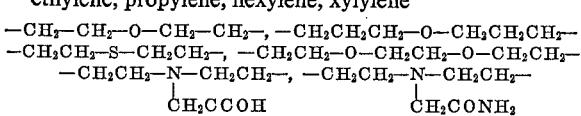

It has surprisingly been found that the poly-N-diacetic acid imides of the Formula I can be prepared by heating to a high temperature of at least 100° C., a poly-N-diacetic acid, derived from organic polyamines, of the general Formula II

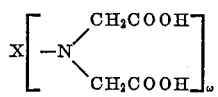

in which X and ω have the same meanings as in Formula I, in the presence or absence of inert organic diluents, with an acid amide of the general Formula III $$R_2CONHR_1$$

in which $R_1$ has the meaning given above and $R_2$ represents hydrogen, a lower inert aliphatic radical or an amino group.

In employing the above method $R_1$ is advantageously an alkyl radical especially the methyl, ethyl or n-butyl, the allyl radical, the β-hydroxyethyl or the γ-hydroxypropyl radical, the β-methoxyethyl, γ-methoxypropyl, or the β-mercaptoethyl radical, the phenyl, methylphenyl or chlorophenyl radical. $R_2$ is advantageously hydrogen or else a lower alkyl radical such as methyl or ethyl group or a primary amino group.

A second method for the preparation of compounds of the Formula I, wherein $R_1$ represents hydrogen comprises to react at a temperature of at least 120° C., a poly-N-diacetic acid of the Formula II given above, if necessary in the presence of further inert organic diluents, with ammonia in an acid amide of the Formula IV

(IV)

in which $R_3$ represents hydrogen or a lower inert aliphatic radical and $R_4$ and $R_5$ each represent a lower inert aliphatic radical.

In Formula IV $R_3$ should preferably be hydrogen. It may, however, also represent a lower alkyl radical, especially a methyl or ethyl radical. $R_4$ and $R_5$ each represent preferably a lower alkyl radical, especially the methyl radical.

In accordance with this invention, applicable starting materials of the Formula II are for example:

Ethylenediamino-(N,N,N',N'-tetraacetic acid),
1,2- and 1,3-propylenediamino-(N,N,N',N'-tetraacetic acid),
2,3- and 1,4-butylenediamino-(N,N,N',N'-tetraacetic acid),
1,5-pentylenediamino-(N,N,N',N'-tetraacetic acid),
1,6-hexylenediamino-(N,N,N',N'-tetraacetic acid),
1,8-octylenediamino-(N,N,N',N'-tetraacetic acid),
1,10,-decylenediamino-(N,N,N',N'-tetraacetic acid),
1,20-icosylenediamino-(N,N,N',N'-tetraacetic acid),
1,2-diaminocyclohexane-(N,N,N',N'-tetraacetic acid),
4-methyl-1,2-diaminocyclohexane-(N,N,N',N'-tetraacetic acid),
1,3-diaminocyclohexane-(N,N,N',N'-tetraacetic acid),
1,4-diaminocyclohexane-(N,N,N',N'-tetraacetic acid),
β,β'-diaminodiethylether-(N,N,N',N'-tetraacetic acid),
β,β'-diamonodiethylthioether-(N,N,N',N'-tetraacetic acid),
ethylene glycol-di-β-aminoethylether-(N,N,N',N'-tetraacetic acid),
diethylene glycol-di-β-aminoethylether-(N,N,N',N'-tetraacetic acid),
γ,γ'-diaminodipropylether-(N,N,N',N'-tetraacetic acid),
γ,γ'-diaminodipropylthioether-(N,N,N'N'-tetraacetic acid),
ω,ω'-diaminodibutylether-(N,N,N',N'-tetraacetic acid),
N'-carboxymethyldiethylenetriamino-N,N,N'',N''-tetraacetic acid,
tri-β-aminoethylamino-N,N,N',N'',N''-hexaacetic acid,
tri-γ-aminopropylamino-N,N,N',N',N'',N''-hexaacetic acid,
4,4'-diaminodicyclohexyl-(1,1)'N,N,N',N'-tetraacetic acid,
4,4'-diamnodicyclohexylmethane-N,N,N',N'-tetraacetic acid,
2,2-bi-(4'-aminocyclohexyl)-propane-N,N,N',N'-tetraacetic acid,
1,4-bi-(aminomethyl)-benezne-N,N,N',N'-tetraacetic acid,
2,6-di(aminomethyl)-4-methyl-1-hydroxybenzene-N,N,N',N'-tetraacetic acid,
1,2,3-tri-(γ-aminopropoxy)-propane-N,N,N',N',N'',N''-hexaacetic acid.

The starting materials of the general Formula II, usable according to the invention, are obtained by methods which are themselves well known from the corresponding polyprimary amines by exhaustive carboxymethylation of the amino groups, for example by their reaction with the alkali salts of the monohalogen acetic acids or with formaldehyde and hydrogen cyanide through alkaline saponification of the cyano methylamino compounds which result primarily therefrom.

The starting materials of the general Formula II are heated for this purpose with a multiple of their weight of acid amide (Formula III), for preference with formamide or with methyl formamide or urea, at least to 100°, preferably to 120–180° C., and maintained at this temperature for a considerable time. The water which results may advantageously be removed by azeotropic distillation using as extractors such organic liquids as are gaseous at the temperatures at which the reaction takes place, for preference by means of aromatic hydrocarbons halogenised as required by the benzene series, for example, toluene, xylene or chlorobenzenes.

When the reaction of the starting material of Formula

II with formamide takes place, carboxyl groups which may be present in isolation will be converted into the corresponding acid amide groups. Thus is obtained, for example, from N'-carboxy-methyl-diethylene-triamino-N,N,N'',N''-tetraacetic acid with formamide, the N'-carbamyl - methyl-diethylenetriamine-N,N,N'',N''-tetraacetic acid diimide.

These poly-N-diacetic acid imides each crystallize out according to their solubility in the acid amide used either when the reaction mixture cools, or they may be isolated by either concentration or dilution of the mixture with a solvent for the acid amide used, in which the polyimide is extremely insoluble.

A simple way of isolating the imides formed consists in distilling off in a high vacuum excess formamide or N-substituted formamides. This, in most cases, leads to products which are sufficiently pure for analytical purposes.

The poly-N-diacetic acid amides produced by the invention, which may also be characterized as poly-(3,5-diketo-piperazinyl-1) compounds, produce as a rule well crystallized substances, which in the form of their salts with concentrated acids in water on synthesising are moderately soluble. Insofar as hydrogen is combined with the 4-position nitrogen of the 3,5-diketo-piperazinyl groups, the new compounds form alkali salts which are also soluble in water. If, however, there is an alkyl, hydroxyalkyl, mercaptoalkyl or alkoxyalkyl group present at the nitrogen in the 4-position of the 3,5-diketo-piperazinyl group, the melting point of the product is considerably reduced. Some of these N-substituted imides are liquid at room temperature. The solubility in organic solvents is also considerably increased by the N-substitution. In cases where there is an N-β-hydroxyethyl or N-γ-methoxypropyl group, the corresponding polyimide is also water soluble.

The new poly-(3,5-diketo-piperazinyl-1)-compounds can be used as levelling agents in making wool inshrinkable by the action of chlorine. They are also valuable intermediate products in the preparation of pharmaceutical remedies, textile accessories and curing agents for epoxy resins.

The N-unsubstituted imides can be halogenated with halogens such as, e.g. chlorine, to form N-chlorimides which serve as bleaching agents. Their superiority over other known chloramino products which also have a bleaching action is that, after splitting off the active chlorine, an effective sequestering agent remains which, at the same time, binds earth alkaline and heavy metals.

Furthermore, some of the compounds prepared according to the invention, especially the in 4-position of the piperazine radical substituted ω,ω'-bis-[3,5-diketopiperazinyl-(1)]alkane, e.g. the 1,2-bis-[4'-methyl-3',5'-diketopiperazinyl-(1)]ethane, have a biological, especially a coccidiostatic effect on poultry, when these compounds are given with the food in a proportion of 0.025 to 0.075%.

The following examples illustrate the invention. In them, unless otherwise indicated, the parts refer to parts by weight. Temperatures are given in degrees centigrade. The relationship of parts by weight to parts by volume is as that of kilograms to litres. Melting points have not been corrected.

Example 1

Ethylenediamino-N,N,N',N'-tetraacetic acid diimide

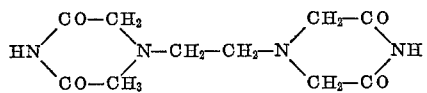

467.2 parts of ethylene diamino-N,N,N',N'-tetraacetic acid are dissolved in 1749 parts of hot formamide and the mixture is heated to 150° for about 11 hours. By the addition of xylene, the water which is produced is continuously distilled off as a water-xylene azeotrope. Crystallization of the ethylenediamino-N,N,N',N'-tetraacetic acid diimide takes place during the reaction itself and especially as the reaction mixture cools off. There are obtained, by filtering and washing the crystals in water and by after-treatment of the mother liquors after drying, 366.7 parts (a yield of 89.5%) of ethylenediamino-N,N,N',N'-tetraacetic acid diimide which melts and disintegrates at 295–300°.

Analysis:

|  | Percent C | Percent H | Percent N |
|---|---|---|---|
| Calculated | 47.2 | 5.55 | 22.03 |
| Found | 47.32 | 5.55 | 22.13 |

The chromatographic analysis of the waste gases showed the following composition: 98% CO, 2% air.

Example 2

87.6 parts of ethylenediamino-N,N,N',N'-tetraacetic acid are stirred in 501.5 parts of acetamide for 7 hours at 147°. 11.6 parts of water are produced thereby (determined by Fischer). The solid reaction product is put in cold water, neutralized with 17.6 parts of NaOH (as a 40% aqueous solution) and filtered off. The residue is then crystallized from formamide. It is identical with the ethylenediamino-N,N,N',N'-tetraacetic acid diimide of Example 1.

Analysis:

|  | Percent C | Percent H | Percent N |
|---|---|---|---|
| Calculated | 47.2 | 5.55 | 22.03 |
| Found | 47.02 | 5.68 | 21.69 |

Example 3

146 parts of ethylenediamino-N,N,N',N'-tetraacetic acid are dissolved in 420 parts of urea at 150°. The mixture is stirred at this temperature for 6¾ hours. The water which forms is distilled off azeotropically with xylene. Then the reaction mixture is stirred well with 800 parts by volume of hot water and filtered off. The residue (130 parts) is again extracted with 800 parts by volume of hot water. It then consists of 103 parts of ethylenediamino-N,N,N',N'-tetraacetic acid diimide which, crystallized from formamide, melts and disintegrates at 298°. Yield 82%, in relation to the quantity of ethylenediamino-N,N,N',N'-tetraacetic acid used.

Analysis:

|  | Percent C | Percent H | Percent N |
|---|---|---|---|
| Calculated | 47.2 | 5.55 | 22.03 |
| Found | 46.61 | 5.29 | 22.32 |

Example 4

N' - carbamylmethydiethylenetriamino - N,N,N'',N'' - tetraacetic acid

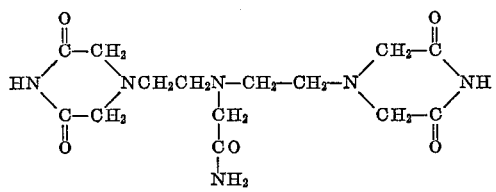

58.9 parts of N'-carboxymethyldiethylenetriamino-N,N,N'',N''-tetraacetic acid are dissolved in 279 parts of formamide and heated to 150° for 20 hours. The water formed is continuously removed as a chlorobenzene-water azeotrope. Subsequently the formamide is distilled off in a high vacuum at 160° and the residue is cooled to −60°. 47 parts of a crude product are thus obtained consisting mainly of N'-carbamylmethyldiethylenetriamino - N,N,N'',N''' - tetraacetic acid diimide. It melts at 130° and the yield is 88% in relation to the quantity of N' - carboxymethydiethylenetriamino - N,N,-N'',N'''-tetraacetic acid.

Analysis—$C_{14}H_{22}N_6O_5$, M.W. 354:

|  | Percent C | Percent H | Percent N | Acid equivalent |
|---|---|---|---|---|
| Calculated | 47.5 | 6.25 | 23.7 | 364 |
| Found | 47.1 | 5.89 | 22.65 | 360 |

If, instead of N' - carboxymethyldiethylenetriamino-N,N,N'',N'''-tetraacetic acid, N'-carboxy-methyl-1,4-dibutylentriamino - N,N,N'',N''' - tetraacetic acid or N' - carboxymethyl - 1,6 - dihexylene-triamino-N,N,N'',N'''-tetraacetic acid is used, then N'-carbamylethyl-1,4-dibutylen-N,N,N'',N'''-tetraacetic acid diimide and N'-carbamylmethyl - 1,6 - dihexylenetriamino-N,N,N'',N'''-tetraacetic acid diimide respectively are obtained in an analogous manner.

*Example 5*

1,2 - diaminocyclohexane - N,N,N',N' - tetraacetic acid diimide

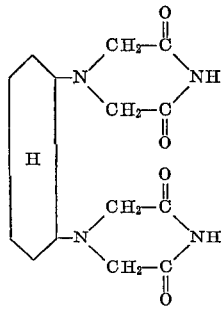

168 parts of 1,2-diaminocyclohexane-N,N,N',N'-tetraacetic acid are dissolved in 600 parts of formamide and 70 parts of xylene, and heated for 7 hours at 140° in the course of the heating, 20 parts by volume of water-xylene azeotrope escape. When the reaction mixture cools off, there crystallizes out a white deposit which when cold is filtered off, washed and dried. 90.6 parts of the diimide of the above formula are obtained. By concentration of the mother liquor to 141½ parts by volume, a further 11 parts of diimide are precipitated in a few days. Yield: 73.5%.

The diimide melts and disintegrates at 300°. It dissolves very easily in 100% formic acid, not at all easily in 85% formic acid, chloroacetic acid, ethylene glycol or morpholine, easily in dimethyl sulphoxide and dimethyl formamide. It is insoluble in chloroform, cyclohexane, dioxan, toluene, glacial acetic acid, nitromethane, ethylmethyl ketone, ethylene glycol monobutyl ether, dimethoxyethane, β-propiolactone and oil of turpentine.

Analysis—$C_{20}H_{29}N_4O_4$:

|  | Percent C | Percent H | Percent N |
|---|---|---|---|
| Calculated | 54.55 | 6.50 | 18.15 |
| Found | 54.55 | 6.36 | 18.41 |

*Example 6*

1,6-hexamethylenediamino-N,N,N',N'-tetraacetic acid diimide

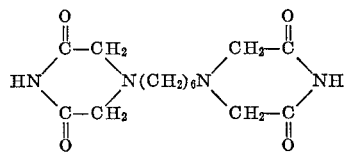

104.4 parts of 1,6-hexamethylenediamino-N,N,N',N'-tetraacetic acid are dissolved in 750 parts of formamide at 150° and kept at the same temperature for 8 hours. The water which forms is continuously distilled off as a water-xylene azeotrope. As the reaction mixture cools off, 55 parts of yellow crystals are deposited. Crystallized out with dioxan, they melt at 213–214°.

Analysis—$C_{14}H_{22}N_4O_4$, M.W. 310:

|  | Percent C | Percent H | Percent N |
|---|---|---|---|
| Calculated | 54.2 | 7.1 | 18.05 |
| Found | 54.14 | 7.14 | 18.17 |

Other diimides are obtained according to this example if, instead of 1,6-hexamethylenediamino-N,N,N',N'-tetraacetic acid, the following compounds are used:

1,4-butylendiamino-N,N,N',N'-tetraacetic acid,
1,10-decylenediamino-N,N,N',N'-tetraacetic acid,
1,12-dodecylenediamino-N,N,N',N'-tetraacetic acid,
1,18-octadecylenediamino-N,N,N',N'-tetraacetic acid and
1,20-icosylenediamino-N,N,N',N'-tetraacetic acid.

*Example 7*

β,β'diaminodiethyl ether-N,N,N',N'-tetraacetic acid diimide

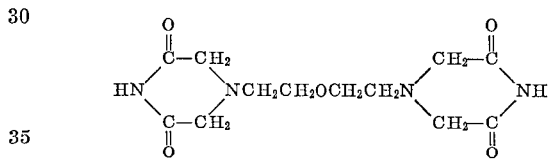

134.6 parts of β,β'-diaminodiethyl ether-N,N,N',N'-tetraacetic acid are dissolved in 315 parts of formamide and heated to 145° for 6 hours. During this period 25.8 parts of water are distilled off as a water-xylene azeotrope. If allowed to stand for a considerable time, there are deposited from the reaction mixture 66.5 parts of β,β'-diaminodiethyl ether-N,N,N',N'-tetraacetic acid diimide. Yield: 55.8%. This diimide is easily soluble in cold water. It is also soluble in hot methanol, acetone, glacial acetic acid, acetic ester and cyclohexane. It is insoluble in toluene and chloroform. The crude product melts at 110°.

Analogous compounds are obtained if, instead of β,β'-diaminodiethyl ether-N,N,N',N'-tetraacetic acid, β,β'-diaminodiethylthioether-N,N,N',N'-tetraacetic acid, γ,γ'-diaminodipropylthioether-N,N,N',N'-tetraacetic acid or γ,γ'-diaminodipropylether-N,N,N',N' - tetraacetic acid is used.

*Example 8*

Ethylenediamino - N,N,N',N' - tetraacetic acid di - N-methyl diimide or 1,2-bis-(4'-methyl-3',5'-diketo-piperazinyl-(1'))-ethane

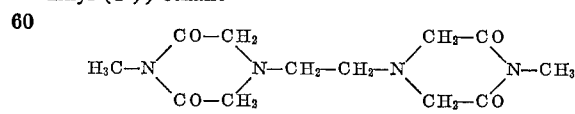

73 parts of ethylene diamino-N,N,N',N'-tetraacetic acid are dissolved in 600 parts of N-methyl formamide at 170° and the solution is heated to 150° for 7½ hours. The water which forms is constantly distilled off as a water-toluene azeotrope. The chromatographic analysis of the waste gases showed: CO and some air.

Upon cooling, 53.5 parts of white crystals are crystallized out after some hours. These are already pure enough for analysis and correspond to the above formula. Their melting point is 181–184°, at which sublimation occurs.

Analysis—$C_{12}H_{18}N_4O_4$, M.W. 282:

|  | Percent C | Percent H | Percent N |
|---|---|---|---|
| Calculated | 51.00 | 6.38 | 19.85 |
| Found | 50.89 | 6.30 | 20.11 |

The 666 parts of mother liquor are concentrated in a vacuum to 219 parts, in the course of which a further 11 parts of equally pure diimide of the above formula, with the same melting point, are precipitated. By further concentration, an additional 1.2 parts of diimide are obtained. The yield amounts to 93.2%. The mother liquor is free of ethylene-diamino-N,N,N',N'-tetraacetic acid.

Other N-substituted imides are obtained if in this example, the N-methyl formamide is replaced by N-ethyl formamide, N-β-mercaptoethyl formamide, N-γ-mercaptopropyl formamide, N-δ-mercaptobutyl formamide, N-β-hydroxyethyl formamide, N-γ-hydroxypropyl formamide, N-ω-hydroxyhexyl formamide, N-β-methoxyethyl formamide, N-β-propoxyethyl formamide, N-γ-methoxypropyl formamide or N-γ-ethoxypropyl formamide.

Example 9

Tris-β-aminoethylamino-N,N,N',N',N'',N'' - hexaacetic acid triimide

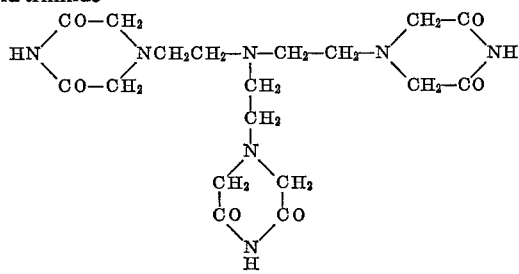

52.15 parts (0.1 mol) of tri-β-aminoethylamino-N,N,N',N',N'',N''-hexaacetic acid are heated in 600 parts of formamide at 150° for 10 hours. The water which forms is continuously distilled off as a water-xylene azeotrope (a total of 9.8 parts of $H_2O$). After cooling, concentration and precipitation of the high-melting mixture, 33 parts of triimide are isolated.

Analysis—$C_{18}H_{27}N_7O_6$, M.W. 437:

|  | Percent N | Acid equivalent |
|---|---|---|
| Calculated | 22.42 | 437 |
| Found | 22.11 | 417 |

Another triimide is obtained in an analogous manner if, instead of tris-β-aminoethylamino - N,N,N',N',N'',N''- hexaacetic acid, the tris-γ-aminopropylamino-N,N,N',N',N'',N''-hexaacetic acid is used.

Further triimides are obtained if, in this example, in place of formamide the N-methylformamide, N-octylformamide, N-γ-methoxypropylformamide, N-β-hydroxyethylformamide are used.

Example 10

29.2 parts of ethylenediamino-tetraacetic acid are heated with 500 parts of N-methyl acetamide at 170°. After half an hour solution is complete. The temperature is then maintained at 150° for 11 hours while the water which is formed (a total of 3.8 parts) is continuously distilled off. Only upon concentration is the diimide precipitated. It is identical with the diimide of Example 8.

Example 11 m-Phenylenediamino-tetraacetic acid diimide

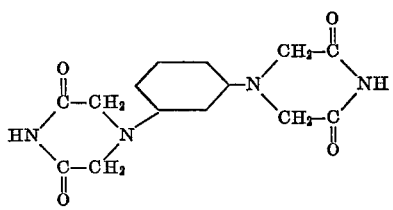

68 parts of m-phenylenediamino-tetraacetic acid are dissolved in 327 parts of formamide and heated to 145° for 9 hours. The water which forms is continuously removed from the reaction mixture as a water-toluene azeotrope. The slightly soluble diimide shows the following values on analysis:

|  | Percent C | Percent H |
|---|---|---|
| Calculated | 55.60 | 4.65 |
| Found | 55.76 | 4.36 |

With p-phenylenediamino-tetraacetic acid as starting material instead of the m-phenylenediamino-tetraacetic acid and otherwise the same conditions, a high-melting diimide is obtained which is soluble in aqueous caustic soda and decomposes as it melts.

Other diimides are obtained if, in this example, instead of the m-phenylenediamino-tetraacetic acid, m-benzylenediamino-tetraacetic acid or o-, m- or p-xylylenediamino-tetraacetic acid is used.

Example 12

Ethylenediamino-N,N,N',N'-tetraacetic acid di-N-allyl-imide

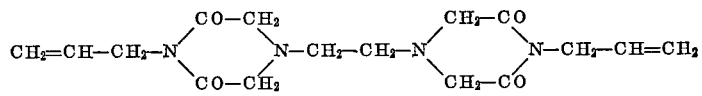

A mixture of 43.8 parts of ethylenediamino-N,N,N',N'-tetraacetic acid and 127.5 parts of N-allyl formamide is heated for 20 hours at 150–160° while stirring. During this time, the water formed is continuously distilled off as a water-toluene azeotrope. The reaction mixture is filtered, and the filtrate is concentrated in a high vacuum. The ethylenediamino-N,N,N',N'-tetraacetic acid di-N-allylimide obtained dissolves very well in methanol, ethanol and ethylene glycol.

Analysis:

|  | Percent C | Percent H | Percent N |
|---|---|---|---|
| Calculated | 57.50 | 6.58 | 16.75 |
| Found | 56.98 | 6.64 | 16.46 |

Corresponding diimides are obtained in an analogous manner if, instead of N-allyl formamide, N-butyl formamide, N-hexyl formamide or N-octyl formamide, N-phenyl formamide or N-methylphenyl formamide or p-chlorophenyl formamide is used.

Example 13

Ethylene glycol-di-β-aminoethylether-N,N,N',N'-tetraacetic acid

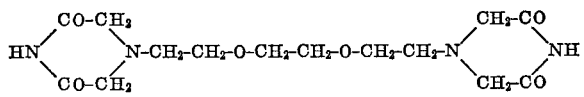

A mixture of 190 parts of ethylene glycol-di-β-aminoethyl ether-N,N,N',N'-tetraacetic acid and 405 parts of formamide is heated for 20 hours at 170° while splitting off water. The water formed is continuously removed from the reaction mixture as water-toluene azeotrope, and the excess formamide is distilled off in a high vacuum. 160 parts of ethylene glycol-di-β-aminoethyl ether-N,N,N',N'-tetraacetic acid diimide are obtained as distillation residue, yield 92.5%.

Analysis:

|  | Percent C | Percent H |
|---|---|---|
| Calculated | 49.10 | 6.43 |
| Found | 49.27 | 6.72 |

Another analogous diimide is obtained if, in this example instead of glycol-di-β-aminoethyl ether-N,N,N',N'-tetraacetic acid, glycol-di-γ-aminopropyl ether N,N,N',N'-tetraacetic acid is used.

Example 14

1,2-diaminocyclohexane-N,N,N',N'-tetraacetic acid di-N-methylimide

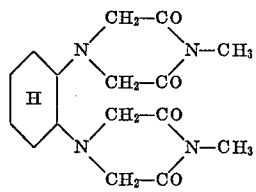

A mixture of 123.4 parts of 1,2-diaminocyclohexane-N,N,N',N'-tetraacetic acid and 206 parts of N-methyl formamide is heated, in the presence of toluene, at 150–160° while stirring. The water is continuously removed from the reaction mixture as water-toluene azeotrope. The reaction is complete after 5 hours. Excess N-methyl formamide is then distilled off in a high vacuum. 10 parts of diimide of the above formula are obtained from the residue which is already sufficiently pure for analysis. It dissolves in acetone, glycol and cellosolve.

Analysis:

|  | Percent C | Percent H | Percent N |
|---|---|---|---|
| Calculated | 57.10 | 7.14 | 16.65 |
| Found | 56.36 | 7.17 | 16.68 |

1,2-diaminocyclohexane-N,N,N',N'-tetraacetic acid reacts under similar conditions with N-ethyl-formamide, N-β-hydroxyethyl formamide or with N-γ-methoxypropyl formamide. The thus obtained N-substituted diimides have a better solubility in organic solvents than the corresponding unsubstituted diimide.

Example 15

N'-carboxymethyldiethylenetriamino-N,N,N'',N''-tetraacetic acid-di-N-methylimide

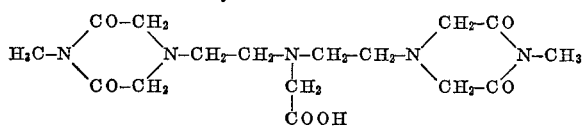

A mixture of 78.6 parts of N'-carboxymethyldiethylenetriamino-N,N,N'',N''-tetraacetic acid and 177 parts of N-methyl formamide is heated for 10 hours at 160°. The water formed is continuously removed as chlorobenzene-water azeotrope. The formamide is then distilled off in a high vacuum and the residue is cooled. The product obtained is water soluble and the yield is 97.5%.

Analysis:

|  | Percent C | Percent H | Percent N |
|---|---|---|---|
| Calculated | 49.1 | 6.54 | 18.30 |
| Found | 49.48 | 6.53 | 18.71 |

Corresponding diimides are obtained in an analogous manner if, instead of N-methyl formamide, N-ethyl formamide, N-allyl formamide, N-γ-methoxypropyl formamide are used.

Further diimides are obtained if, in this example, in place of N'-carboxymethyldiethylenetriamino-N,N,N'', N''-tetraacetic acid, the N'-ethyldiethylene-triamino-N,N,N'',N''-tetraacetic acid, the N'-propyldiethylene-triamino-N,N,N'',N'''-tetraacetic acid, the N'-hexyldiethylene-triamino-N,N,N'',N''-tetraacetic acid or the N'-propyl-dipropylenetriamino-N,N,N'',N''-tetraacetic acid are used.

Example 16

Ethylenediamino-N,N,N',N'-tetraacetic acid di-N-octylimide

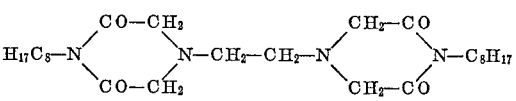

A mixture of 29.2 parts of ethylenediamino-N,N,N',N'-tetraacetic acid and 252 parts of N-octylformamide is heated for 16 hours at 175° while stirring. The condensed water formed is continuously removed from the reaction mixture as water-toluolazeotrope by means of a water separator. Then excess N-octylformamide is distilled off at 190° and 0.1 mm. Hg. 44 parts of the diimide of the above formula are obtained from the residue which is already sufficiently pure for analysis. It dissolves in acetone, ethanol, chloroform, trichlorethylene, glacial acetic acid, ethyl acetate acetonitrile, butylamine, ether. The diimide is only soluble in ligroin (B.P. 110° C.) and ethylene when heated.

Analysis:

|  | Percent C | Percent H | Percent N |
|---|---|---|---|
| Calculated | 65.20 | 9.65 | 11.72 |
| Found | 65.80 | 9.82 | 11.85 |

Example 17

Ethylenediamine-N,N,N',N'-tetraacetic acid-di-N-β-hydroxy-ethyl diimide

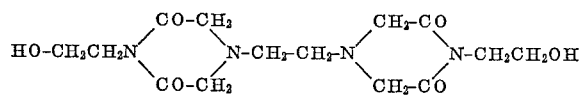

A mixture of 43.8 parts of ethylenediamine N,N,N',N'-tetraacetic acid and 178 parts of N-β-hydroxyethyl-formamide is heated for 7½ hours at 160° while stirring. Thereby, during condensation, 10.4 parts of water are separated out and isolated. The reaction mixture contains no further free acid. The reaction mixture is concentrated in high vacuum. 61 parts of the abovementioned diimide is obtained which is soluble in alcohol and water.

Analysis—$C_{14}H_{22}N_4O_6$, M.G. 342:

|  | Percent C | Percent H | Percent N | Percent OH |
|---|---|---|---|---|
| Calculated | 49.07 | 6.44 | 16.40 | 9.98 |
| Found | 49.49 | 6.46 | 16.87 | 9.51 |

Similarly, the 1,6-diaminohexane-N,N,N',N'-tetraacetic acid is reacted with N-β-hydroxyethylformamide to the corresponding N-β-hydroxyethyldiimide.

Example 18

Ethylenediaminetetraacetic acid - di - N-methoxypropyl diimide.

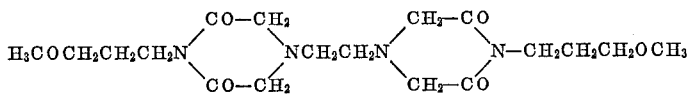

A mixture of 58.4 parts of N,N,N',N'-ethylenediamine-tetraacetic acid and 234 parts of N-γ-methoxypropyl-formamide are heated for 10 hours at 170° while stirring. During this time the water formed is continuously removed by means of a water separator as water-toluol-azeotrope. Then excess N-γ-methoxypropylformamide is removed by heating up to 170° C. and 0.01 mm. Hg. The residue, 78.2 parts, is already analytically pure, which can also be seen from the ultimate analysis (elementary analysis). Yield 98.1%. This product has a very good solubility in most organic solvents; it dissolves even in water.

Analysis—$C_{18}N_{30}N_4O_6$, M.G. 398:

|  | Percent C | Percent H | Percent N |
|---|---|---|---|
| Calculated | 54.3 | 7.55 | 14.10 |
| Found | 54.14 | 7.54 | 13.95 |

Similarly, 33.6 parts of 1,6-diaminohexane-N,N,N',N'-tetraacetic acid are heated to 160° C. with N-γ-ethoxy-propylformamide while continuously dehydrating, and working as above. This diimide is also characterised by its generally very good solubility.

Example 19

Ethylenediamine - N,N,N',N' - tetraacetic acid di-N-butylimide.

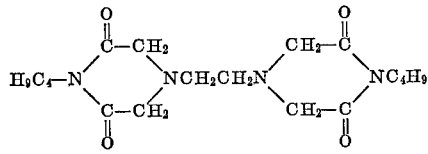

29.2 parts of ethylenediamine-N,N,N',N'-tetraacetic acid and 202 parts of N-butylformamide are heated for 19 hours at 170–180° while stirring and under dehydration. Then excess formamide is distilled off in the vacuum and the final product is heated for 3 hours to 160° by 0.01 mm. Hg. 38 parts of the dibutyldiimide is obtained. Yield 99%.

Analysis—$C_{18}H_{30}N_4O_4$, M.G. 366:

|  | Percent C | Percent H | Percent N |
|---|---|---|---|
| Calculated | 59.2 | 8.2 | 15.32 |
| Found | 58.89 | 8.27 | 15.28 |

Example 20

Ethylenediamine-N,N,N',N'-tetraacetic acid di-N-phenylimide

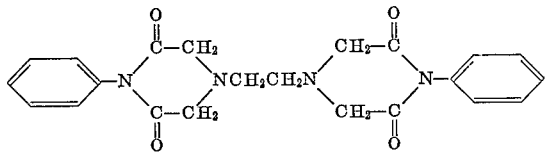

A mixture of 29.2 parts of ethylenediamine-N,N,N',N'-tetraacetic acid and 260 parts of N-phenylformamide, is heated for 22 hours at 180° C. The condensed water is continuously removed from the reaction mixture with a water separator. The excess N-phenylformamide is removed in the high vacuum by 200° (0.1 mm. Hg.). The distillation residue is 39.1 parts of diimide. Yield 95.5%.

Analysis—$C_{22}H_{22}N_4O_4$, M.G. 406:

|  | Percent C | Percent H | Percent N |
|---|---|---|---|
| Calculated | 65.00 | 5.43 | 13.80 |
| Found | 65.91 | 5.29 | 13.78 |

This diimide is soluble in acetone, ethylmethylketone, tetrahydrofuran, ethanol and in hot benzene. Recrystallized from butanol.

Example 21

Ethylenediamino-N,N,N',N'-tetraacetic acid diimide.

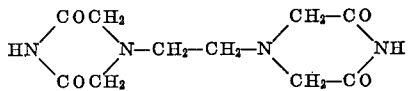

60 parts of ethylenediamino-N,N,N',N'-tetraacetic acid are dissolved in 500 parts of boiling dimethyl formamide. When the process is completed, the reaction mixture is heated to 150° and ammonia gas is introduced over 8½ hours. The water which forms is distilled off as a water-xylene azeotrope (in all, 8.7 parts of water are removed in this way). Upon cooling, there are deposited after some hours 6 parts of ethylenediamino-N,N,N',N'-tetraacetic acid diimide which melts at 298°. Yield is 10% of the theoretical in relation to the quantity of ethylenediamino-N,N,N',N'-tetraacetic acid Analysis:

|  | Percent C | Percent H | Percent N |
|---|---|---|---|
| Calculated | 47.2 | 5.55 | 22.03 |
| Found | 47.34 | 5.60 | 22.03 |

In another aspect of the invention it involves new N-diacetic acid imides of the Formula V

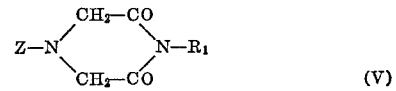

wherein:

Z represents an alkyl, alkoxyalkyl or alkylthioalkyl radical containing at least 3 carbon atoms, a hydroxyalkyl radical containing at least 2 carbon atoms, an alkanoyl radical containing at least 4 carbon atoms or a cycloaliphatic radical, and $R_1$ represents hydrogen or a aliphatic radical or a mononuclear aryl radical.

If Z represents an alkyl, alkoxyalkyl or alkylthioalkyl radical containing at least 3 carbon atoms, then it will be for example a propyl, butyl, amyl, hexyl, octyl, decyl, dodecyl, tetradecyl, hexadecyl, octadecyl, icosyl or triacontyl group, or else the β-methoxy- or β-ethoxy- ethyl group or the γ-methoxy- or γ-ethoxy-, γ-octyloxy-, γ-dodecyloxy-, γ-benzyloxy-, γ-(ethylthio)- propyl group; but if Z indicates a hydroxyalkyl radical containing at least 2 carbon atoms, then it will be composed of, e.g. the β-hydroxyethyl, the β-hydroxypropyl, the γ-hydroxypropyl or the β,γ-dihydroxypropyl group, if Z is a cycloaliphatic radical, then it is, for example, a cyclohexyl or a chlorocyclohexyl, a phenylcyclohexyl or a hydroxycyclohexyl group. Z can also be an alkanoyl radical such as, e.g. the butyryl, caproyl, lauroyl, stearyl or oleyl radical.

$R_1$ is a lower alkyl radical such as, e.g. the methyl, ethyl, n-butyl, n-hexyl, octyl radical, a hydroxyalkyl radical such as, e.g. the β-hydroxyethyl radical, the γ-hydroxyalkyl radical, a lower alkoxyalkyl radical such as, e.g. the β-methoxyethyl, β-ethoxyethyl, γ-methoxypropyl, γ-ethoxypropyl radical or also a mercaptoalkyl radical such as, e.g. the β-mercapto ethyl radical. $R_1$ is also a mononuclear aryl radical such as, e.g. phenyl, methylphenyl, dimethylphenyl, chlorophenyl, dichlorophenyl radical.

Particularly valuable compounds correspond to the formula

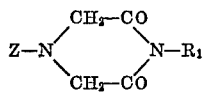

wherein:

Z is a member selected from the group consisting of alkyl having 3 to 20 carbon atoms, especially butyl, hexyl, dodecyl, octadecyl, $C_nH_{2n+1}$—O—$C_m$—$H_{m2}$—,

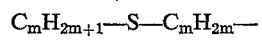

hydroxyalkyl containing 2 to 3 carbon atoms such as, e.g. the β-hydroxyethyl, β+γ-dihydroxypropyl, benzyloxyalkyl, alkanoyl having 4 to 18 carbon atoms especially lauroyl, stearyl group and the cyclohexyl, whereby $m$ is 2 to 4, especially 2, and $n$ is 1 to 12 and, $R_1$ is a member selected from the group consisting of hydrogen, an alkyl having 1 to 8 carbon atoms, especially methyl, ethyl, alkenyl especially having 3 or 4 carbon atoms, such as e.g. allyl, mercaptoalkyl especially having 2 to 4 carbon atoms such as e.g. β-mercaptoethyl, hydroxyalkyl especially having 2 to 6 carbon atoms such as e.g. β-hydroxyethyl, γ-hydroxypropyl, alkylthioalkyl especially having 3 to 5 carbon atoms such as e.g. γ-(ethylthio)propyl, alkoxyalkyl especially having 3 to 7 carbon atoms such as e.g. γ-methoxypropyl, and a mononuclear aryl group.

In addition the compounds of the formula

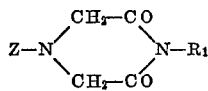

wherein:

Z is a member selected from the group consisting of an alkyl having 3 to 20 carbon atoms, especially butyl, dodecyl, the $C_nH_{2n+1}$—O—ethyl, $C_nH_{2n+1}$—O—propyl, γ-(ethylthio)propyl, β-hydroxyethyl, γ-hydroxypropyl, the cyclohexyl and the alkanoyl having 4 to 18 carbon atoms, especially lauroyl, stearyl group, wherein $n$ is 1 to 12 and $R_1$ is a member selected from the group consisting of hydrogen, an alkyl having 1 to 8 carbon atoms, especially methyl, allyl, β-mercaptoethyl, γ-methoxypropyl, β-hydroxyethyl, γ-hydroxypropyl, γ-(ethylthio)propyl, phenyl, methylphenyl and chlorophenyl, are preferred.

The new N-diacetic acid imides of the formula

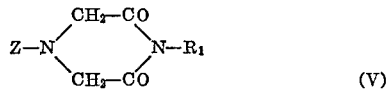

are obtained by reacting at a temperature of at least 100° C. an N-diacetic acid of the formula

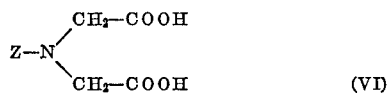

with an acid amide of the formula

wherein Z and $R_1$ have the same meanings, given above in Formula V and $R_6$ represents hydrogen or a lower aliphatic radical.

In employing the above method $R_1$ is advantageously an alkyl radical especially the methyl, ethyl or n-butyl, the allyl, the β-hydroxyethyl or the γ-hydroxy propyl radical, or the ω-hydroxyhexyl radical, the β-methoxyethyl, γ-methoxypropyl or the β-mercaptoethyl radical, the phenyl, methylphenyl or chlorophenyl radical. $R_6$ is preferably hydrogen or then a lower alkyl radical such as e.g. the methyl or ethyl radical.

Finally, it is advantageous if the compounds correspond to the formula

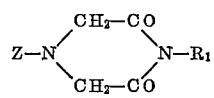

wherein:

Z is an alkyl group having 3 to 20 carbon atoms, especially, the butyl, dodecyl or octadecyl group, the β-hydroxyethyl, the β-methoxyethyl, β-ethoxyethyl, γ-methoxypropyl, γ - ethoxypropyl, γ - propoxypropyl, γ-(ethylthio)-propyl, γ - hydroxypropyl, cyclohexyl, butyryl, lauroyl or the stearyl group, and $R_1$ is hydrogen, an alkyl group having 1 to 8 carbon atoms, especially methyl, ethyl or the octyl group, allyl, β-mercaptoethyl, γ-methoxypropyyl, β-hydroxyethyl, γ-hydroxypropyl, γ - (ethylthio) - propyl, phenyl, methylphenyl and the chlorophenyl group.

N-diacetic acids of the general Formula V which can be used according to the invention may be, for example: n-propylamino-, isopropylamino-, n-butylamino-, sec. butylamino-, isoamylamino-, n-hexylamino-, n-octylamino-, n-decylamino, n-dodecylamino-, n-tetradecylamino-, n-hexydecylamino-, n-octadecylamino-, icosylamino-, triacontylamino-, β - methoxyethylamino-, β - ethoxyethylamino-, γ-methoxy-propylamino-, γ-ethoxypropylamino-, β-hydroxyethylamino-, γ-hydroxypropylamino-, β,γ-dihydroxypropylamino-, cyclohexylamino-, 2 - hydroxycyclohexylamino-, or 4-phenylcyclohexylamino- N,N-diacetic acids.

The starting materials of the general Formula I which can be used according to the invention are obtained by methods which are themselves well known, from the corresponding monoprimary amines by exhaustive carboxymethylation of the amino group, for example by their reaction with the alkali salts of the monohalogen acetic acids or with formaldehyde and hydrogen cyanide with alkaline saponification of the cyanomethylamino compounds primarily arising.

The starting materials of the general Formula VI are heated for this purpose with many times their weight of an acid amide of Formula VII, for preference with formamide, to at least 100°, preferably to 120–180° and maintained at this temperature range for a considerable time. The water which collects may be advantageously removed by azeotropic distillation, using such organic liquids as extractors as are gaseous at the temperatures at which the reaction takes place. Such extractors may well be halogenized aromatic hydrocarbons of the benzene group, for example toluene, xylene or chlorobenzene.

The N-diacetic acid imides which result each crystallize out according to their solubility in the acid amide used, either when the reaction mixture cools or they may be isolated by concentration, by fractional distillation of the reaction mixture or by their dilution with a solvent for the acid amide employed, in which the N-diacetic acid amide is extremely insoluble. A simple way of isolating the imides formed consists in distilling off excess formamide or N-substituted formamides in a high vacuum. This, in most cases, leads to products which are pure for analytical purposes.

The N-diacetic acid imides in accordance with the invention, which may also be designated 3,5-diketo-piperazines, generally produce well crystallized substances which are moderately soluble in the form of their salts with strong acids in water on synthesizing. Insofar as hydrogen is combined with the 4-position nitrogen of the 3,5-diketo-piperazinyl group, the new compounds also form alkali salts which are soluble in water. If, however, there is an alkyl, hydroxyalkyl, mercaptoalkyl or alkoxyalkyl group combined with the 4-position nitrogen of the 3,5-diketo-piperazinyl group, then the melting point of the compound is considerably reduced. Some of these N-substituted imides are liquid at room temperature. The N-substitution also causes a considerable increase in the solubility of the compounds in organic solvents. In compounds having an N-β-hydroxyethyl or N-γ-methoxypropyl group, the corresponding monoimide is also soluble in water.

The new 3,5-diketo-piperazine compounds can be used as levelling agents in rendering wool unshrinkable by the action of chlorine. They are also valuable intermediate products for the production of pharmaceutical ingredients and textile accessories.

The N-unsubstituted imides can be halogenated with halogens such as, e.g. chlorine, to form the N-chloro-imides which serve as bleaching agents. Their superiority over known chloramine products which also have a bleaching action, is that after splitting off the active chlorine, an effective sequestering agent remains which, at the same time, binds earth alkaline and heavy metals.

The following examples illustrate the invention. Where not otherwise indicated, the parts therein are given as parts by weight. The temperatures are given in degrees centigrade. The relationship of parts by weight to parts by volume is as that of kilograms to litres. Melting points have not been corrected.

*Example 22* n-Butylamino-N,N-diacetic acid imide.

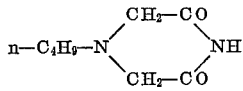

170 parts of n-butylamino-N,N-diacetic acid are heated with 500 parts of formamide to 140° for 10 hours. The water which forms is distilled off as a toluene-water azeotrope. By fractional distillation of the reaction mixture, 94.5 parts of n-butylamino-N,N-diacetic acid imide are obtained. Boiling point 120–126° at 0.05 millimetres of mercury. $n_{s.g.25}=1.4953$. Yield: 61.5% of the theoretical.

Analysis.—$C_8H_{14}O_2N_2$, M.W. 170:

|  | Percent C | Percent H | Percent N |
|---|---|---|---|
| Calculated | 56.50 | 8.25 | 16.50 |
| Found | 56.18 | 8.31 | 16.60 |

An analogous compound is obtained if instead of n-butylamino-N,N-diacetic acid, n-propylamino-N,N-diacetic acid is used.

*Example 23* n-Dodecylamino-N,N-diacetic acid imide.

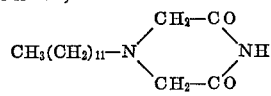

120 parts of n-dodecylamino-N,N-diacetic acid are dissolved in 350 parts of hot formamide, xylene is added and the whole is heated for 6¾ hours at 142–145°. The imide begins to crystallize out while the heating is continuing. It is filtered off after cooling of the reaction mass, washed with methanol and dried at 60°, with a pressure of 12 millimetres of mercury. Melting point: 68–70°. The yield comprises 91 parts (81.2% of the theoretical). The imide is talcose and is soluble in glacial acetic acid, dioxane, chloroform and ethanol. It is insoluble in petroleum ether.

Analysis.—$C_{16}H_{30}O_2N_2$, M.W. 280:

|  | Percent C | Percent H | Percent N | Acid equivalent |
|---|---|---|---|---|
| Calculated | 67.56 | 10.62 | 9.95 | 282 |
| Found | 68.03 | 10.85 | 10.01 | 279.2 |

Compounds with similar characteristics are obtained if n-decylamino-N,N-diacetic acid, n-tetradecylamino-N,N-diacetic acid, n-hexadecylamino-N,N-diacetic or icosylamino-N,N-diacetic acid be substituted for n-dodecylamino-N,N-diacetic acid.

*Example 24* n-Dodecylamino-N,N-diacetic acid methylimide.

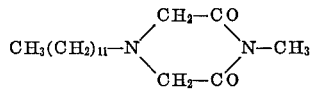

90.3 parts of n-dodecylamino-N,N-diacetic acid and 370 parts of methyl formamide are heated to 150° for 6½ hours. The water is continuously distilled off as a xylene-water azeotrope. After being allowed to stand for some days, the reaction mixture is filtered and the residue is crystallized out with aqueous methanol. A white, scaly product results, which melts at 46–47°. Yield: 74.9 parts (83.5% of the theoretical).

Analysis.—$C_{17}H_{32}O_2N_2$, M.W. 294:

|  | Percent C | Percent H | Percent N |
|---|---|---|---|
| Calculated | 69.00 | 10.82 | 9.45 |
| Found | 69.19 | 10.49 | 9.36 |

Analogous compounds are obtained if, instead of N-methyl formamide, N-ethyl formamide, N-butylformamide, N-octyl formamide, N-butenyl formamide, N-allyl formamide, N-phenyl formamide, N-methylphenyl formamide, N-p-chlorophenyl formamide, N-γ-mercaptopropyl formamide, N-β-mercaptoethyl formamide, N-β-hydroxyethyl formamide, N-γ-hydroxypropyl formamide, N-ω-hydroxyhexyl formamide, N-γ-methoxypropyl formamide, N-β-(ethylthio) ethyl formamide or N-γ-(ethylthio)propyl formamide are used.

*Example 25* n-Octadecylamino-N,N-diacetic acid imide.

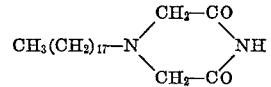

66 parts of n-octadecylamino-N,N-diacetic acid are heated in 264 parts of formamide to 142–151° for 9½ hours. The water formed is continuously removed from the mixture as a xylene-water azeotrope. After the remainder has been kept for a considerable time at room temperature, the octadecylamino-N,N-diacetic acid imide is deposited. On filtering and washing in ethanol, the product is pure enough for analysis.

Analysis.—$C_{22}H_{42}O_2N_2$, M.W. 366:

|  | Percent C | Percent H | Percent N |
|---|---|---|---|
| Calculated | 72.20 | 11.48 | 7.65 |
| Found | 71.78 | 11.60 | 7.79 |

*Example 26*

γ-Methoxypropylamino-N,N-diacetic acid imide.

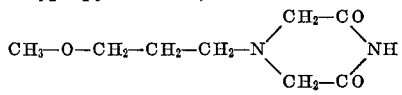

205 parts of γ-methoxypropylamino-N,N-diacetic acid are dissolved in 900 parts of formamide and heated to 145–150° for 18 hours. The water which forms is distilled off as a xylene-water azeotrope. For the purpose of isolating the imide, the reaction mixture is fractionated in a high vacuum. There results 131 parts of the imide, which boils at 136–138° at a pressure of 0.05 millimetre of mercury. The yield amounts to 71% of the theoretical. After a second distillation, the product is pure enough to be analysed.

Other compounds having similar properties are obtained according to this example if, instead of γ-methoxypropylamino-N,N-diacetic acid, β-methoxyethyl amino-, β-ethoxyethylamino-, β-ethylthioethylamino-, γ-ethylthiopropylamino-, γ-ethoxypropylamino-, γ-propoxypropylamino-, γ-octyloxypropylamino-, γ-dodecyloxypropylamino- or γ-benzyloxypropylamino- N,N-diacetic acid is used.

*Example 27*

β-Hydroxyethylamino-N,N-diacetic acid imide

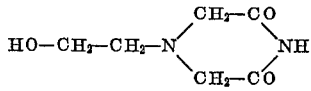

A mixture composed of 164 parts of β-hydroxyethylamino-N,N-diacetic acid, 905 parts of formamide and 78 parts of toluene is heated to 150° for 6 hours. The water which forms is removed from the reaction mixture as a toluene-water azeotrope. For the purpose of isolating the imide, the mixture is fractionated in a high vacuum. There results 60 parts of the imide, which boils at 180–201° at a pressure of 0.7 to 1.0 millimetre of mercury. The yield amounts to 41% of the theoretical. The imide is easily soluble in the majority of organic solvents.

Analysis—$C_6H_{10}O_2N_2$, M.W. 142:

|  | Percent C | Percent H | Percent N |
| --- | --- | --- | --- |
| Calculated | 45.49 | 6.33 | 17.72 |
| Found | 45.00 | 6.01 | 16.91 |

Compounds with similar characteristics are obtained if γ-hydroxypropylamino-N,N-diacetic acid or β,γ-dihydroxypropylamino-N,N-diacetic acid be substituted for β-hydroxyethylamino-N,N-diacetic acid.

*Example 28*

Cyclohexylamino-N,N-diacetic acid imide

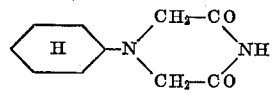

112.5 parts of cyclohexylamino-N,N-diacetic acid are dissolved in 300 parts of formamide and heated for 5 hours to 150°. Then the reaction mixture is concentrated in stages from 357 to 188 parts. After some days, crystallization sets in. 36.8 parts of the imide are isolated, B.P. 101–103° C. Yield: 37.8% of the theoretical.

Analysis—$C_{10}H_{16}O_2N_2$, M.W. 196:

|  | C | H | N |
| --- | --- | --- | --- |
| Calculated | 61.20 | 8.16 | 14.29 |
| Found | 61.20 | 8.26 | 14.55 |

If, instead of the formamide, N-γ-hydroxypropyl formamide is used, then cyclohexylamino-N,N-diacetic acid-N-γ-hydroxypropyl imide is obtained. This product dissolves very well in most organic solvents.

*Example 29*

Lauroylamino-N,N-diacetic acid imide

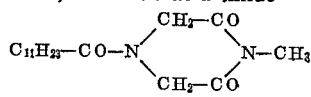

A mixture of 126 parts of N-lauroyliminodiacetic acid and 236 parts of N-methyl formamide is heated for 6½ hours at 160° with continual removal of water. Excess N-methyl formamide is quantitatively removed by heating for 3 hours at 180° (bath temperature) under 0.1 mm. Hg. The residue is a highly viscous mass which solidifies on standing. Yield: 93.0%. The lauroylamino-N,N-diacetic acid imide obtained dissolves in methanol, ethanol, chloroform, dioxan, tetrahydrofuran, acetone and ethyl Cellosolve.

Analysis:

|  | C | H | N |
| --- | --- | --- | --- |
| Calculated | 65.60% | 9.70% | 9.07% |
| Found | 65.32% | 9.96% | 9.41% |

Analogous compounds are obtained according to this example if, instead of N-lauroyliminodiacetic acid, N-butyrylimino diacetic acid, N-caproylimino diacetic acid or N-stearylimino diacetic acid is used.

What is claimed is:

1. A compound of the formula

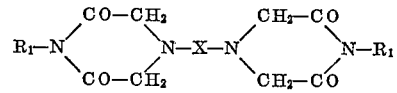

wherein:

$R_1$ is a member selected from the group consisting of hydrogen, alkyl with 1 to 8 carbon atoms, alkenyl with 3 to 4 carbon atoms, mercaptoalkyl with 2 to 4 carbon atoms, hydroxyalkyl with 2 to 6 carbon atoms, alkylthioalkyl with 3 to 7 carbon atoms, phenyl, methylphenyl and chlorophenyl, X is a member selected from the group consisting of alkylene with 1 to 20 carbon atoms, cyclohexylene, phenylene, benzylene, xylylene

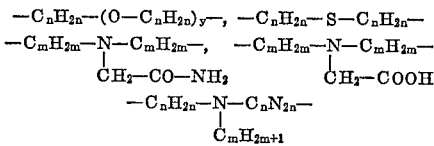

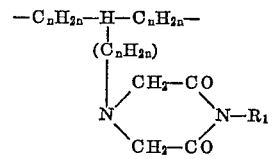

and

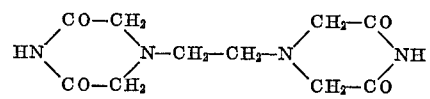

wherein n is 2 to 3, m is 2 to 6 and y is 1 to 2.

2. The compound of the formula

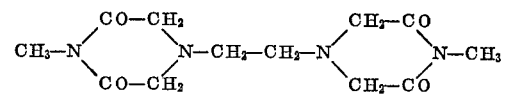

3. The compound of the formula

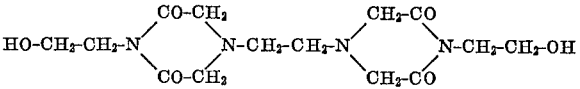

4. The compound of the formula

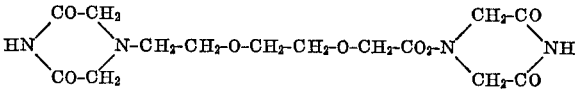

5. The compound of the formula $$HN\begin{matrix}CO-CH_2\\CO-CH_2\end{matrix}N-CH_2-CH_2-O-CH_2-CH_2-O-CH_2-CO_2-N\begin{matrix}CH_2-CO\\CH_2-CO\end{matrix}NH$$

6. The compound of the formula
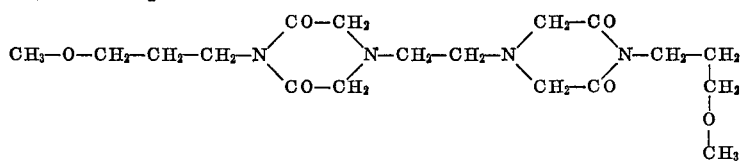
7. The compound of the formula
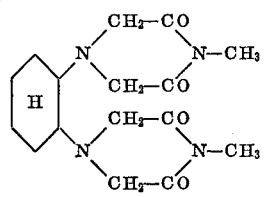
8. The compound of the formula
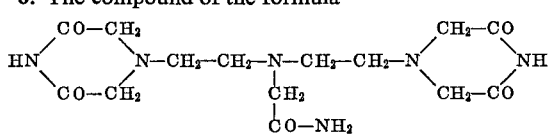
References Cited by the Examiner
UNITED STATES PATENTS
| | | | |
|---|---|---|---|
| 2,750,383 | 6/56 | Safir et al. | 260—268 |
| 2,972,618 | 2/61 | Bortnick | 260—268 |
| 3,026,321 | 3/62 | de Jongh et al. | 260—268 |
OTHER REFERENCES
Badinand et al., Societé Chimique de France, pp. 1495–1496 (1958).
Badinand et al., Societé Chimique de France pp. 382–383 (1960).
NICHOLAS S. RIZZO, *Primary Examiner.*
DUVAL T. McCUTCHEN, *Examiner.*